United States Patent [19]

Yu

[11] Patent Number: 5,109,075

[45] Date of Patent: * Apr. 28, 1992

[54] COMB-SHAPED GRAFT COPOLYMERS OF ALLYL TERMINATED MACROMOLECULAR MONOMERS OF POLYETHERS

[75] Inventor: Simon H. Yu, Westlake, Ohio

[73] Assignee: The B. F. Goodrich Company, Akron, Ohio

[*] Notice: The portion of the term of this patent subsequent to Feb. 2, 2005 has been disclaimed.

[21] Appl. No.: 500,660

[22] Filed: Mar. 27, 1990

Related U.S. Application Data

[63] Continuation-in-part of Ser. No. 202,644, Jun. 6, 1988, abandoned.

[51] Int. Cl.$^5$ .................. C08F 283/06; C08F 216/02; C08F 216/12

[52] U.S. Cl. .................. 525/404; 525/925; 526/263; 526/265; 526/292.9; 526/307.5; 526/308; 526/318.5; 526/329.6; 526/333; 568/614; 568/616

[58] Field of Search ............... 525/404, 925; 526/263, 526/265, 292.9, 307.5, 308, 318.1, 318.5, 329.6, 333; 568/614, 616

[56] References Cited

U.S. PATENT DOCUMENTS

| | | | |
|---|---|---|---|
| 4,122,056 | 10/1978 | Ramlow | 526/333 |
| 4,256,910 | 3/1981 | Hsu | 528/409 |
| 4,424,311 | 1/1984 | Nagaoka | 526/333 |
| 4,500,693 | 2/1985 | Takehara | 526/333 |
| 4,540,742 | 9/1985 | Okamoto | 525/61 |
| 4,680,358 | 7/1987 | Yu | 525/333 |
| 4,722,978 | 2/1988 | Yu | 525/404 |

FOREIGN PATENT DOCUMENTS

| | | | |
|---|---|---|---|
| 185308 | 11/1982 | Japan | 526/333 |
| 058285 | 4/1983 | Japan | 526/333 |
| 185514 | 8/1986 | Japan | 526/333 |
| 1087292 | 10/1967 | United Kingdom . | |

Primary Examiner—John C. Bleutge
Assistant Examiner—David Buttner
Attorney, Agent, or Firm—Alfred D. Lobo; Nestor W. Shust; William A. Skinner

[57] ABSTRACT

A copolymer of an olefinically unsaturated monomer and an allylically headed macromolecular monomer ("macromer") of a ring-openable cyclic ether ("CE") is prepared as a comb-shaped graft copolymer of macromer. A wide variety of olefinically unsaturated monomers may be used to form the copolymer. The macromer, having an allylic group near one end and a hydroxyl group at the other, is first produced by cationic ring-opening polymerization of the CE in conjunction with an unsaturated alcohol (propagator) having an allyl double bond. The polymerization to form the graft copolymer proceeds either by free radical polymerization or by metathesis polymerization. The graft copolymer of macromer has a hydrocarbon backbone and pendant chains of polymerized CE, each pendant chain terminating with an OH group.

16 Claims, No Drawings

COMB-SHAPED GRAFT COPOLYMERS OF ALLYL TERMINATED MACROMOLECULAR MONOMERS OF POLYETHERS

BACKGROUND OF THE INVENTION

This application is a continuation-in-part application of Ser. No. 202,644 filed Jun. 6, 1988 now abandoned.

This invention relates to comb-shaped graft copolymers of an ethylenically unsaturated monomer with a macromolecular monomer ("macromer" for brevity) of a polyhaloalkylene oxide, the macromer having a single vinyl functional "head" group at one end, through which the macromer is polymerizable, and a terminal hydroxyl (OH) group at the other end. Such macromers are disclosed in my U.S. Pat. No. 4,722,978 issued Feb. 2, 1988, the disclosure of which is incorporated by reference thereto as if fully set forth herein. A macromer, by definition, has only a single olefinic double bond.

The macromers used to produce the copolymers of my invention are water-insoluble, as are the copolymers produced. Such macromers cannot be made by anionic polymerization, therefore exclude macromers of 1,2-epoxides such as ethylene oxide (EO) and propylene oxide (PO).

The copolymerization of the macromer generates a novel polymer with a hydrocarbon backbone having polyether branches thus resulting in a comb-shaped ("comb") copolymer with pendant chains of the macromer. Each "tine" (pendant chain) of the comb is an uninterrupted one (that is, having no branch) terminating with an OH group. Such polymerization of the macromer of this invention, to form comb copolymers which are special form of graft copolymers, differs from graft copolymerization in the sequence of formation of the backbone relative to the formation of the graft unit. This invention relates to comb copolymers of my '978 macromer of polyether with an ethylenically unsaturated monomer (simply "monomer" for brevity).

Macromers used in this invention have a Mn in the range from about 200 to about 3000 though even higher mol wts up to about 10,000 may be used, if desired. The term "macromer" is used herein to denote at least one ring-opened cyclic ether ("CE") with an "allylic", that is, ethylenically unsaturated as defined, head group. If the macromer is formed from a single CE it is referred to as a "homomacromer"; if from more than one comonomer which appears randomly, it is referred to as a "macromer copolymer"; and, if a copolymer is specifically formed by sequential copolymerization, it is referred to as a "macromer block copolyether".

The macromer is formed by cationic ring-opening polymerization of a CE in conjunction with an alkenyl alcohol which functions as the generator of the propagating species, and a suitable cationic ring-opening catalyst. The alkenyl alcohol (referred to as the "propagator" because it functions as the propagating species (OH group) generator in the presence of a cationic initiator) may be substituted with substituents which do not interfere with the initiation, propagation and transfer reactions which generate the macromer in a polymerization which has the characteristics of a living polymerization. The macromer has substantially uniform molecular weight (mol wt) distribution such that the ratio of the weight average mol wt (Mw) to the number average mol wt (Mn) is not substantially above about 3, preferably less than 2.

In my '978 patent I disclosed how, under particular conditions, a cationic ring-opening polymerization of a CE in conjunction with an allylically unsaturated alcohol and a cationic ring-opening catalyst, produces a polyether macromer having an allylic group near one end and a hydroxyl (OH) group at the other. An allylic group is one which is characterized by having a double bond between adjacent, optionally substituted, carbon atoms neither of which has bonds to an oxygen atom. The allylic group of the alcohol does not undergo carbocationic polymerization under the acidic conditions required for the cationic ring-opening polymerization of the CE used. The polymerization proceeds by polyaddition of the CE to the OH group which is the propagating species.

I further disclosed the general process for manufacturing a polyether macromer having an allylic group near one end and a hydroxyl group at the other, comprising, polymerizing (A) a cationically ring-openable cyclic ether selected from the group consisting of
(i) at least one alkylene oxide having the structure

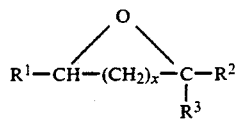

(I)

wherein, x is an integer in the range from 0 to about 4, except that when x>1, a second alkylene oxide having x=1 or 0 must be present, and, $R^1$, $R^2$ and $R^3$ are independently selected from the group consisting of hydrogen, $C_1-C_{20}$ alkyl (having from 1 to about 20 carbon atoms) and haloalkyl, and, $C_6-C_{20}$ aryl and aralkyl, and, at least one of $R^1$, $R^2$, and $R^3$ is hydrogen; and, (ii) an aliphatic or aromatic glycidyl ether having the structure

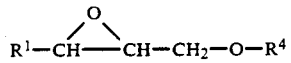

(II)

wherein $R^1$ has the same connotation as hereinabove; and, $R^4$ represents a member selected from the group consisting of a substituted group such as a hydrocarbon group, i.e. $C_1-C_{20}$ alkyl or substituted alkyl, particularly haloalkyl, alkoxyalkyl, aryl (Ar) or substituted aryl (Ar—Q), particularly wherein Q represents $C_1-C_{10}$ alkyl, or haloalkyl; and, (B) a monoolefinically unsaturated primary or secondary alcohol represented by a structure selected from the group consisting of (i)

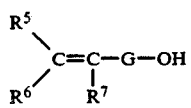

(III)

wherein G is a spacer selected from the group consisting of branched or linear alkylene, aralkylene, haloalkylene, haloaralkylene, oxyalkylene and acrylkoxyalkylene, each having from 1 to about 20 carbon atoms ($C_1-C_{20}$); and, (ii)

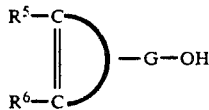 (IV)

wherein,
the cyclic structure represents a single or fused ring structure having from 5 to 10 carbon atoms;
G, is defined as above, or a bond; and,
$R^5$, $R^6$ and $R^7$ are independently selected from the group consisting of hydrogen, $C_1$-$C_{20}$ alkyl (having from 1 to about 20 carbon atoms) and haloalkyl, and; $C_6$-$C_{20}$ aryl and aralkyl; in the presence of an effective amount of (C) a cationic initiator selected from the group consisting of Friedel-Crafts acids, relatively strong protic organic and inorganic acids, oxonium salts and stable carbenium ions; so as to produce a macromer having the structure

 (V)

wherein
R represents the residue of said monoolefinically unsaturated alcohol,
M represents the residue of at least one said cyclic ether which is ring-opened, and,
m represents an integer in the range from 2 to about 500, more preferably from 2 to about 100.

I also taught that a macromer block copolyether may be prepared by polymerizing plural cyclic ethers sequentially, or by using a macromer of this invention as a propagator, so as to have the structure

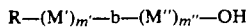 (VI)

wherein M' and M" represent two ring-opened cyclic ethers, and, m' and m" are integers each in the range from 1 to about 300 such that m'+m"=m.

This invention relates to using the macromer, homomacromer, or, macromer of random or block copolyether, to tailor graft copolymers of the macromer with a wide array of unsaturated olefins.

Among the numerous polyether oligomers which have been made in the prior art are those disclosed in British 1,087,292 by Baylis et al. The oligomers are made by copolymerizing a monoepoxide containing an ethylenically unsaturated ether group, for example an allyl glycidyl ether (AGE) with an alkylene or arylene oxide, epihalohydrins, or, an alkyl or aryl glycidyl ether in the presence of an alkali metal hydroxide. In each case he ends up with a polyether backbone with at least one terminal OH group (the other terminal group is not specified) and most likely two terminal OH groups.

When AGE is homopolymerized, it does not form a macromer but an oligomer with a polyether backbone having pendant chains, each chain having a terminal double bond (from the AGE), represented as follows:

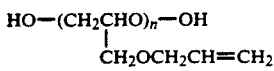

Such oligomers of monoepoxides are essentially linear, but do not have a single terminal double bond as they are not propagated by an unsaturated alcohol. When AGE is copolymerized with epichlorohydrin (ECH), the result is a polyether backbone but the chains do not have terminal OH groups, and each pendant AGE chains contain unsaturation. The copolymer of AGE-ECH has the structure:

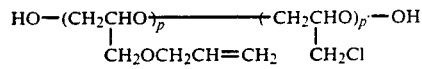

If they had polymerized their AGE homopolymer or AGE-ECH copolymer, or other polyether oligomer with an olefinically unsaturated monomer, which he did not, the result is a a highly crosslinked randomly graft copolymer network which has no resemblance to a comb copolymer.

SUMMARY OF THE INVENTION

I have found that a comb-shaped copolymer may be prepared by polymerizing a polyether macromer V or VI with an olefinically unsaturated monomer $M_o$, preferably either by free radical or metathesis polymerization, using conventional free-radical and coordination catalysts respectively, for such polymerizations, to form comb copolymers having the structures

 (VIIa)

and,

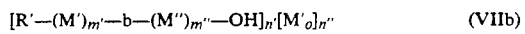 (VIIb)

wherein M represents the residue of one or more cyclic ethers which are ring-opened, at least one of which is a haloalkylene oxide having the structure

 (I)

wherein
at least one of $R^1$, $R^2$ and $R^3$ is hydrogen, at least one is haloalkyl, and the remaining substituent is selected from the group consisting of hydrogen, $C_1$-$C_{20}$ alkyl and haloalkyl, and, $C_6$-$C_{20}$ aryl, alkoxyaryl, alkaryl and aralkyl;

$M'_o$ represents the repeating unit derived from said olefinically unsaturated monomer $M_o$;

R' represents the residue of R after polymerization;

n' represents an integer in the range from 1 to about $10^4$, preferably 1-$10^3$ and refers to the number of pendant OH-terminated polyether chains;

n" represents an integer in the range from 1 to about $10^5$, more preferably 1-$10^4$; and, R, M, M', M", m, m' and m" have the same connotation as before.

It is therefore a specific object of this invention to provide a comb-shaped graft copolymer having pendant chains with OH ends, by copolymerizing the allylically terminated macromer with an olefinically unsaturated monomer.

Still other specific objects of this invention are to provide graft copolymers of polyepichlorohydrin (PECH) which may be quaternized to yield antistats, fiber softeners, excipients for drugs and biomimetic agents.

DETAILED DESCRIPTION OF PREFERRED EMBODIMENTS

Details for preparing the macromer, homomacromer, or macromer polyether copolymer, or macromer block copolyether are provided in my '978 patent. Typically, the CE (I) or (II) and the alcohol (III) or (IV), each of which is moisture-free, are charged to a jacketed glass-lined reactor provided with a mechanical agitator and fitted with a thermoprobe and condenser. The reactor is purged with nitrogen and warmed to the polymerization temperature. The catalyst, for example, triethyloxonium hexafluorophosphate (TEOP) dissolved in methylene chloride is dripped in and the temperature of the reaction mass is controlled to provide a satisfactory rate of polymerization by raising or lowering the temperature of the circulating medium in the jacket.

The polymerization is generally carried out at a temperature in the range from about 25°-50° C. but this range is not critical, some polymerizations proceeding satisfactorily at as low as 0° C., or lower, and others at as high as 90° C., or higher. The progress of the reaction is monitored by measuring total solids. Upon completion, the polymerization is terminated with aqueous sodium bicarbonate solution, and an antioxidant such as Goodrite® 3114 is added, and the temperature of the mixture raised to about 60° C. and maintained for about an hour. The liquid macromer is separated from the aqueous phase and washed with distilled water at room temperature. Unreacted monomer, if any, may be removed by distillation under vacuum.

The conversion to the macromer and its mol wt are controlled by the ratio of the monomer to the alcohol, according to a known equation. About 0.1–0.5g of TEOP is used per kg of monomer when allyl alcohol is the alcohol used. The amount of sodium bicarbonate used as a shortstop is about three times the amount of TEOP. The amount of antioxidant added is about 0.2% by wt of the macromer. It is essential that all reactants be moisture-free because each molecule of water, if present, will initiate a polymer terminated with OH groups at both ends of the chain.

FT infrared spectra were recorded with a Nicolet 7199 spectrometer. Samples were prepared by applying a thin coat of macromer on a KBr crystal.

Carbon-13 NMR spectra were obtained at 20.1 MHz using a Bruker WP-80 spectrometer. Macromers were examined as a 20 wt % solution in benzene-$d_6$ or chloroform-d with internal tetramethylsilane reference at 30° C.

Proton NMR spectra were obtained at 200.13 MHz in chloroform-d at 30° C. using a Bruker WH-200 spectrometer. Trichloroacetylisocyanate was used as a derivatizing agent for the OH group analysis.

Mass spectra were obtained with a Varian MAT 311A mass spectrometer in the field desorption mode. Samples were dissolved in either methanol or tetrahydrofuran (THF). The solution was then saturated with solid LiBr so that the lithiated molecular ions [MLi]+ were produced during analysis.

Glass transition temperature ($T_g$) is determined by a Perkin-Elmer DSC-2 differential scanning calorimeter at a 40° C./min heating rate under helium.

Hydroxyl number (OH No.) was determined by acetylation with an acetyl anhydride-pyridine mixture according to a standard procedure and the end point is determined by automatic titration. The OH No. is defined as the milligram equivalent of KOH per gram of the macromer, where a mole of KOH is equivalent to one mole of OH group.

Iodine number was determined based on the addition of iodine monochloride to the olefinic double bond. The excess iodine monochloride was then determined by titration with thiosulfate. $I_2$ No. is defined as the grams of $I_2$ absorbed per 100 g of macromer.

The halogen, for example, chlorine content is measured by a modified Shoniger method and used to calculate the number of epichlorohydrin ("ECH") units in the macromer.

Illustrative examples of the haloalkylene oxides (or aliphatic haloepoxides) which may be used include 1-chloro-2,3,epoxypropane (ECH), 1-bromo-2,3-expoxypropane (epibromodydrin), 1-chloro-2,3-epoxybutane, 1-iodo-2,3-epoxyhexane, 3-chloro-4,5-epoxyoctane, 1-chloro-2,3-epoxycyclohexane, 1-bromo-2,3-epoxymethylbutane, 2-chloro-2-methyl-3,4-epoxypentane, and the like.

1,4-epoxides such as THF and 1,6-epoxides such as oxepane ("OXP") do not homopolymerize but do copolymerize with haloalkylene oxides.

Among the monoolefinically unsaturated acyclic "allylic" alcohols having the structure (III) which may be used, are relatively short chain alcohols having from 3 to about 6 carbon atoms such as allyl alcohol, 2-methyl-2-propene-1-ol (2-methallyl alcohol), 2-buten-1-ol (crotyl alcohol), 1-buten-3-ol (1-methallyl alcohol), 3-buten-1-ol, 4-penten-1-ol, 2-pentene-1-ol, 3-penten-2-ol, 4-penten-2-ol, 2-methyl-1-buten-3-ol, 2-methyl-1-butene-4-ol, 3-methyl-2-buten-1-ol, 2-ethyl-1-propen-3-ol, 2-ethyl-1-penten-3-ol, 5-hexen-1-ol, 4-hexen-1-ol, 5-hexene-1-ol, 2-methyl-1-penten-3-ol, 2-methyl-4-penten-3-ol, 4-methyl-3-penten-1-ol, and the like; relatively long chain alcohols having from 7 to about 20 carbon atoms such as 9-decen-1-ol, 10-undecen-1-ol (10-undecylenyl alcohol), and naturally occurring citronellol or oleyl alcohol; arylalcohols in which the OH group is on the sidechain such as cinnamyl alcohol, and those in which the OH group is a phenolic OH group such as 2-allyl phenol; and, monoadducts of a single CE unit to the above mentioned "allylic" alcohols, such as 2-hydroxyethyl allyl ether, 2-hydroxy-1-methylethyl allyl ether, 2-hydroxy-2-methylethyl allyl ether, 4-hydroxybutyl allyl ether, diethylene glycol monoallyl ether, 2-hydroxy-2-chloromethyl ethyl allyl ether, and the like.

Among the allylic cyclic alcohols having the structure (IV) which may be used are those in which the olefinic bond is in the ring which may be a single or fused ring structure having from 5 to 10 carbon atoms, such as for example, 2-cyclohexene-1-ol, 3-cyclohexen-1-methanol, 6,6-dimethyl bicyclo[3.3.1]hept-2-ene-2-ethanol[(1S)-(—)-Nopol], 5-norbornene-2-methanol, and bicyclo(2.2.2)oct-5-ene-2-methanol.

In the more preferred embodiments of this invention the water-insoluble macromer is formed with a head group derived from any desired "allylic" alcohol and a polymer which may be: (i) a homopolymer of a haloalkylene oxide; (ii) a copolymer of a haloalkylene oxide with another haloalkylene oxide; (iii) a copolymer of a haloalkylene oxide with a $C_2$–$C_{20}$ alkylene oxide or a $C_4$–$C_{20}$ alkoxyalkylene oxide; (iv) a copolymer of a haloalkylene oxide with THF; (v) a copolymer of a haloalkylene oxide with OXP.

Random copolymers are formed by simply mixing the monomers, while block copolymers are formed by the sequential addition of the monomers, except that no block copolymers are formed with either THF or OXP homopolymer.

The macromer is formed by the action of a cationic ring-opening catalyst identified hereinabove with the "allylic" alcohol (III) or (IV) and the alkylene oxide (I) or (II), under mild reaction conditions, namely a temperature in the range from about 0° C. to about 150° C., and more preferably from about 25°-80° C., at ambient or slightly elevated pressure.

The catalyst is used in an amount sufficient to initiate the polymerization. It is most prefered to use a cyclic or acyclic oxonium salt which may be primary, secondary or tertiary. The cyclic oxonium salt may be prepared by reaction of an acyclic oxonium salt with THF. It is most preferred to use a trialkyloxonium or other oxonium salt of the $HMF_6$ acid prepared as described in U.S. Pat. No. 3,585,227. The amount of catalyst used is not critical, from about 0.001 part to about 1 part per 100 parts by wt of oxirane reactants, and more preferably from about 0.01 to about 0.1 part, being generally sufficient. It is desirable, both for economic reasons and for control of the reaction, to keep the amount of catalyst used as low as possible.

The amount of catalyst used has very little effect on the mol wt of the macromer formed, but affects the rate, which in turn affects the temperature of the reaction. Most polymerizations proceed satisfactorily with about 0.05 parts of catalyst per 100 parts of CE. The mol wt is controlled by the ratio of alkylene oxide or glycidyl ether to allylic alcohol. Because the polymerization proceeds via polyaddition, a designed (desired) mol wt may be obtained. If the mol wt of a macromer is kept relatively low by including from about 2 to about 8 repeating units, the linear macromer is formed substantially free of cyclic oligomers, but at least a trace of cyclic oligomers is always found in practice. Most preferred linear macromers have a Mn in the range from about 200 to about 3000.

A homomacromer of polyepichlorohydrin (PECH) with an allylic head group is conveniently prepared using allylic alcohol and ECH and conducting the polymerization reaction in bulk at about 30° C. Infrared, nmr and FD mass spectroscopy, GPC, liquid chromatography (LC), and chemical analyses for chlorine and OH number confirmed the structure of the macromer as being represented by

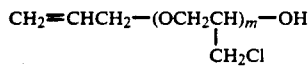 (VIII)

wherein m is in the range from 2 to about 100.

The terminal OH group of the macromers (V) and (VI) are in some cases required to be end-capped with an end-capping group so that there is no OH group to interfere with the subsequent utilization (in a reaction or copolymerization). The end-capping group is not narrowly critical and a variety of esterification and etherification reactions may be used to cap the terminal OH groups, as for example disclosed in U.S. Pat. Nos. 2,998,409 and 3,507,927; British Patents Nos. 748,856; 848,660; 869,323; 877,256; 911,959; inter alia; or, by reacting with an alkylisocyanate as in British Patent No. 924,259; or, by reacting with diazomethane as in British Patent No. 894,439; or, by reacting with acrylonitrile or trialkylchlorosilane.

The preferred end-capped polyether macromer is represented by the structure

 (ECP)

wherein Z is the residue of an end-capping unit selected from the group consisting of

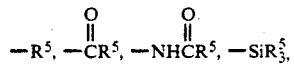

$-CH_2CH_2CN$, $-SO_3Na$, $-SO_3K$, $-SO_3NH_4$, and the like, wherein R and $R^5$ have the same connotation as hereinabove, but $R^5$ cannot be H.

The macromers of this invention, end-capped or not end-capped, depending upon which of the foregoing ethylenically unsaturated head groups is present, and the structure and length of its chain, may be tailored to provide a wide variety of properties in copolymers of macromer formed with them in subsequent polymerizations. Such polymerizations include:

1. Grafting the macromer on a polymer by a free radical reaction initiated by an appropriate initiator or by radiation.
2. Forming a comb copolymer by copolymerizing the macromer with a copolymerizable monomer containing an ethylenically unsaturated functional group by:
   a. free radical polymerization
   b. metathesis polymerization Grafting of macromer may be effected by polymerizing a macromer with a comonomer of ethylenically unsaturated monomer, onto an existing polymer backbone initiated by a free-radical or radiation. This type of conventional graft-polymerization is a well-known art (see for example "Graft Copolymers" by Battaerd, H. A. J. and Tregear, G. W., Interscience Publishers, New York 1967). The graft copolymerization may be effected by any of the conventional techniques of emulsion, bulk, suspension and solution polymerization. Polymerization may be initiated by heat, peroxide, or hydroperoxide decompositon, redox catalysts, or any other free-radical generation, such as by radiation. The chemical nature of the existing polymer is not critical so long as it contains no groups which inhibit polymerization. However, polymers lacking in reactive groups generally give low yields of grafted material. For many industrial applications, the presence of only 2-5% of graft copolymer is sufficient to improve the physical properties of the unmodified material. One specific example is the mixing of liquid unsaturated polyester (described in U.S. Pat. No 4,101,604 the disclosure of which is incorporated by reference thereto as if fully set forth herein) with styrene and a macromer of this invention, and thermoforming the mixture in the presence of a free radical catalyst, so that the macromer is grafted.

Comb copolymers of macromers may be derived from a macromer, end-capped or not end-capped, with one or more conventional ethylenically unsaturated monomers. The length to which the backbone is grown may be controlled by conventional means to provide the desired mol wt of the comb copolymer. It will be recognized that the length of each pendant polyether chain is fixed by the mol wt of the macromer in advance. The relative molar amount of the polyether macromer to a copolymerizable monomer will preferably range from about 3 (macromer):1 (comonomer) to about 1 (macromer) : 1000 (comonomer).

When a comb-shaped graft copolymer of polyether macromer is desired, it is prepared by polymerizing a polyether macromer (V) with an olefinically unsaturated monomer so as to have the structure (VIIa) supra.

When an end-capped macromer (ECP) is copolymerized, a comb-shaped graft copolymer has the structure

$$[R-(M)_m-OZ]_n\cdot[M'_o]_n \qquad (IX)$$

Monomers suitable for forming comb copolymers include:

(i) $C_2-C_{12}$ vinyl monomers such as readily available vinyl chloride, vinyl acetate, acrylonitrile, ethylene, propylene, 4-vinyl pyridine, 2-vinyl pyridine, N-vinyl pyrrolidone, N-vinyl phthalimide, vinyl benzoic acid, ethyl vinyl ether, salts of vinyl sulfonate, vinylidene chloride, N-vinyl carbazole, and the like;

(ii) $C_8-C_{16}$ styryl monomers such as styrene, 4-chlorostyrene, vinyl toluene, alpha-methyl styrene, cyanostyrene, chlorostyrene, and the like;

(iii) alpha,beta-ethylenically unsaturated carboxylic acids such as acrylic acid and methacrylic acid having from 3 to 8 carbon atoms, and derivatives thereof selected from the group consisting of esters of $C_1-C_{20}$ alcohols such as ethyl acrylate, ethyl methacrylate, glycidyl acrylate, butyl acrylate, 2-ethylhexyl acrylate; acrylamide and amides of $C_1-C_{20}$ amines such as N,N-dimethylacrylamide; and, metal salts such as sodium acrylate; and, the corresponding analogs of methacrylates and methacrylamide;

(iv) $C_4-C_8$ diene monomers such as butadiene and isoprene;

(v) $C_3-C_{10}$ allylically unsaturated monomers such as allyl acetate, allyl alcohol, monoallyl esters, diallyl maleate, diallyl carbonate, diallyl fumarate, and diallyl phthalate; and, (vi) $C_5-C_{14}$ cyclic olefins such as norbornene, dicyclopentadiene, cyclopentene, 1,5-cyclooctadiene and norbornadiene.

Free-radical chain polymerization, commonly used in the art as described in "Encyclopedia of Polymer Science and Technology" Vol 7, Interscience Publishers, New York (1967), and more specifically in "Allyl Compounds And Their Polymers" by C. E. Schildknecht, Wiley-Interscience New York, 1973, is preferred for the polymerization of the macromer (III) having an aliphatic vinyl head, with one or more of the copolymerizable monomers (i)-(v). It is typically carried out with a free-radical initiator and can be carried out in bulk, mass, solution, slurry emulsion, or dispersion polymerization.

Metathesis polymerization, described for example in U.S. Pat. No. 3,853,830, is preferred for the copolymerization of a macromer (IV) having an alicyclic vinyl head, with one or more of the copolymerizable monomers (vi).

Comb-shaped grafted copolymers derived with my macromers may be used to produce new polymeric materials designed for (A) their bulk properties as a function of properties of the combination of backbone and pendant chain polymers, and, (B) their pendant chains performing a specific function.

In the group (A), a macromer with elastomeric properties and low Tg, may be incorporated into a thermoplastic such as polystyrene, poly(vinyl chloride) (PVC), poly(methyl methacrylate), or poly(acrylonitrile), by copolymerization with corresponding ethylenically unsaturated monomer, to improve the toughness of the thermoplastic, or form a new thermoplastic elastomer.

In the group (B), low Tg pendant chains of macromer of a graft copolymer serve as non-extractable plasticizer. For hydrophilic macromers, pendant chains of macromer of a graft copolymer improve antistatic properties, wettability, dyeability, adhesion, or spreadability for coating applications, and to provide non-fouling properties which minimize protein or cell adsorption to polymeric surfaces in medical applications. They can also be used as polymeric surfactants. Pendant chains of macromer also improve dispersability and compatibility of the graft copolymer for blends. For example, grafted copolymers of a macromer of PECH and n-butyl acrylate or butadiene are good impact modifiers for PVC. Another example is of a graft copolymer of a macromer of PECH with styrene which is useful as a compatibilizer for the blend of incompatible PVC and polystyrene.

The homomacromer (VIII) and other macromers having the general structure (V) are particularly useful as non-aqueous dispersants for sterically stabilized dispersion polymerizations because the terminally unsaturated head group serves to anchor the dispersant by copolymerization with the monomer (for example, acrylic acid) which is to be polymerized. In such polymerizations, shortly after initiation of polymerization, polymer begins to precipitate from the solution and forms aggregates which interfere with the reaction by retarding access of monomer to free radicals. This contributes to poor removal of heat and several related problems. The macromer interferes with formation of the aggregates and the viscosity of the reaction mass is substantially reduced. The effectiveness of the macromer (VIII) as a dispersant in a dispersion polymerization of acrylic acid in benzene is illustrated in Example 20 hereinbelow.

The OH groups of pendant chains of graft copolymers of macromers can be used as reactive sites to cross-link or couple with other functional polymers with a suitable coupling agent, such as diisocyanate.

The macromer of this invention may be chain extended with other polyols to form radiation-curable polyurethanes with a diisocyanate as described in U.S. Pat. Nos. 4,377,679; 3,960,572; and, 3,850,770.

After the macromer (VIII) is quaternized (aminated), it is particularly useful in the preparation of quaternized oligomers for water treatment and other applications such as antistats and dispersants. Amination of the chloromethyl groups in PECH with a wide variety of aliphatic and aromatic amines is known to produce the corresponding ammonium salt which provides cationic charges and imparts hydrophilicity to the polymer. Thus, the normally hydrophobic PECH oligomer is converted to a hydrophilic polymer, but a polymer with both hydrophilic and hydrophobic characteristics is difficult to obtain. The ability to control these properties allows one to 'fabricate' water-treatment chemicals.

The aminated macromer has the structure

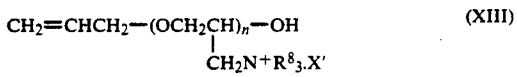

$$\begin{array}{c} CH_2=CHCH_2-(OCH_2CH)_n-OH \\ | \\ CH_2N^+R^8{}_3.X' \end{array} \qquad (XIII)$$

wherein

X' represents an anion, for example halogen, n is an integer in the range from 2 to 100, and $R^8$ represents the substituents of an amine used to aminate the macromer.

An illustrative macromer of ECH generated by allyl alcohol is represented by (V), and written as follows:

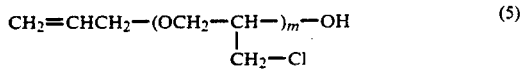

$$CH_2=CHCH_2-(OCH_2-\underset{\underset{CH_2-Cl}{|}}{CH}-)_m-OH \quad (5)$$

An illustrative macromer of a copolymer of ECH and n-butyl glycidyl ether, the macromer generated by allyl alcohol is represented by (VI), and written as follows:

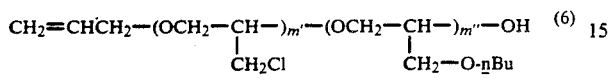

$$CH_2=CHCH_2-(OCH_2-\underset{\underset{CH_2Cl}{|}}{CH}-)_{m'}-(OCH_2-\underset{\underset{CH_2-O-\underline{n}Bu}{|}}{CH}-)_{m''}-OH \quad (6)$$

An illustrative comb copolymer of the macromer ECH copolymerized with styrene, the macromer generated by allyl alcohol is represented by (VIIa), and written as follows:

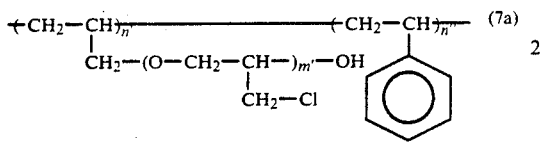

(7a)

An illustrative comb copolymer of the macromer ECH block-polymerized with n-butyl glycidyl ether, then copolymerized with styrene, the block macromer generated by allyl alcohol is represented by (VIIb), and written as follows:

(7b)

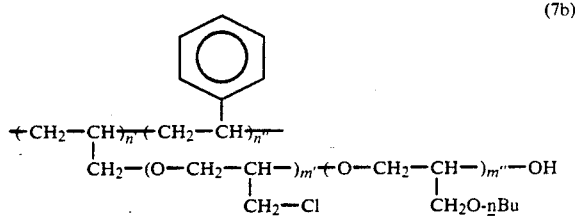

EXAMPLES 1-4

In the following 4 illustrative examples the macromer (VIII) was made as described hereinbefore, in a nitrogen atmosphere, with moisture-free reactants charged to a glass-lined reactor, and TEOP catalyst in $CH_2Cl_2$ is dripped into the reactor. The amount of catalyst is varied in Exs. 1 and 2, all other reaction conditions being kept the same; in Exs. 3 and 4 the ratio of ECH to allyl alcohol (AA) is varied to obtain a targeted mol wt Mn. The polymerization temperature was controlled at 30°-35° C. with an ice-bath and overnight reactions were carried out at room temperature (20° C.).

TABLE I

|  | Ex. 1 | Ex. 2 | Ex. 3 | Ex. 4 |
|---|---|---|---|---|
| Targeted Mn | 550 | 550 | 1000 | 2000 |
| ECH, wt., kg | 1.0 | 1.0 | 0.496 | 0.340 |
| moles | 10.8 | 10.8 | 5.4 | 3.7 |
| AA, wt., kg | 0.125 | 0.125 | 0.029 | 0.0097 |
| moles | 2.2 | 2.2 | 0.50 | 0.17 |
| Ratio ECH/AA, mole | 5.0 | 5.0 | 10.7 | 22. |
| wt. | 8.0 | 8.0 | 17.1 | 35.1 |
| TEOP, wt., g | 0.6 | 0.9 | 0.25 | 0.20 |

TABLE I-continued

|  | Ex. 1 | Ex. 2 | Ex. 3 | Ex. 4 |
|---|---|---|---|---|
| wt. % | 0.053 | 0.080 | 0.048 | 0.057 |
| Time of rxn, hr | 24 | 24 | 5 | 24 |
| Conversion, % | 97 | 100 | >97 | 98 |

The resulting macromer from each of the 4 runs set forth as Exs. 1-4 in the Table I hereinbefore was analyzed. The results are set forth below in Table II:

TABLE II

|  | Ex. 1 | Ex. 2 | Ex. 3 | Ex. 4 |
|---|---|---|---|---|
| Mn | | | | |
| from GPC | 615 | 614 | 977 | 1830 |
| from OH No. | 559 | 534 | 1025 | 2200 |
| from $I_2$ No. | 554 | 558 | 1100 | — |
| from stoich | 505 | 510 | 1040 | 2010 |
| GPC Mw | 792 | 797 | 1528 | 3330 |
| Ratio Mw/Mn | 1.29 | 1.30 | 1.6 | 1.8 |
| OH No. titration | 100. | 105. | 54. | 25. |
| Iodine No. | 45.8 | 45.5 | 23 | — |
| Visc.*, cps @ 25 | 775 | 846 | 10460 | 22000 |
| $T_g$, by DSC, °C. | −59 | −57 | −42 | −39 |
| % cyclic oligomers | <1 | <1 | <1 | 10 |

*viscosity herein, and in all following illustrative examples is Brookfield viscosity measured @ 25° C.

In the following illustrative examples 5-8, a macromer copolymer (V) wherein M represents a repeating unit of at least one haloalkylene oxide and one alkylene oxide, the units in the chain being randomly connected, is made by bulk polymerization of a mixture of the monomers under conditions analogous to those described hereinabove. Each of the copolymers includes ECH as a comonomer and any one of ethylene oxide (EO), propylene oxide (PO), tetrahydrofuran (THF) and oxepane (OXP). The copolymers are identified as follows: (EO/ECH); (PO/ECH); (THF/ECH); and, (OXP/ECH) in Exs. 5-8 respectively, the latter being oxirane comonomers. The conditions of polymerization are set forth in Table III herebelow.

TABLE III

| Macromer co'mer | Ex. 5 EO/ECH | Ex. 6 PO/ECH | Ex. 7 THF/ECH | Ex. 8 OXP/ECH |
|---|---|---|---|---|
| Monomer | EO | PO | THF | OXP |
| wt., g | 35. | 35. | 100. | 50. |
| moles | 0.79 | 0.69 | 1.39 | 0.50 |
| Comonomer | ECH | ECH | ECH | ECH |
| wt., g | 65. | 64. | 50. | 25. |
| moles | 0.70 | 0.69 | 0.54 | 0.27 |
| Comonomer/monomer | 1.13 | 0.87 | 2.57 | 1.85 |
| AA, wt., g | 11.6 | 11.6 | 6.2 | 3.1 |
| moles | 0.2 | 0.2 | 0.11 | 0.05 |
| TEOP, g | 0.15 | 0.13 | 0.6 | 1.0 |
| wt. % | 0.13 | 0.12 | 0.38 | 1.28 |
| Targeted Mn | 503 | 498 | 1317 | 1317 |
| Rxn temp. °C., | 0 | 30 | 20 | 35 |
| Time of rxn, hr | 7 | 30 | 7 | 72 |
| Total solids, % | 55 | 55 | 56 | 87 |

The resulting macromer copolymer from each of the 4 runs set forth as Exs. 5-8 in Table III hereinabove was analyzed. The results are set forth in Table IV below.

TABLE IV

| Macromer co'mer | Ex. 5 EO/ECH | Ex. 6 PO/ECH | Ex. 7 THF/ECH | Ex. 8 OXP/ECH |
|---|---|---|---|---|
| Mn | | | | |
| from GPC | 463 | 441 | 1340 | 1230 |
| from OH No. | 392 | 379 | 872 | 722 |
| from $I_2$ No. | 446 | 403 | 1004 | 1716 |

TABLE IV-continued

| Macromer co'mer | Ex. 5 EO/ECH | Ex. 6 PO/ECH | Ex. 7 THF/ECH | Ex. 8 OXP/ECH |
|---|---|---|---|---|
| Mw/Mn | 1.30 | 1.35 | 3.4 | 2.6 |
| Brookfield visc. | <100 | <100 | 1200 | 2000 |
| $T_g$, by DSC, °C. | −79. | −83. | −25. | −78. |
| OH No. | 143 | 148 | 64 | 78 |
| Iodine No. | 57 | 63 | 25 | 15 |
| % cyclic oligomers | 3.4 | <1 | 1.4 | 1.9 |

Homomacromers and macromer copolymers prepared as illustrated in the foregoing examples show characteristic absorption at about 3450 cm$^{-1}$ (broad) assigned to the terminal hydroxyl group and at 1650 and 3080 cm$^{-1}$ to the C=C stretching of the terminal allyl group by FT infrared spectroscopic analysis. The terminal allyl group of the macromers is also detected by proton and carbon-13 nmr:

| | CH$_2$=CH—CH$_2$O— | | |
|---|---|---|---|
| $^1$H nmr, ppm | 5.3(d) 5.2(d) | 5.9(m) | 4.0(d) |
| $^{13}$C nmr, ppm | 116 | 136 | 72 |

FD mass spectra of these macromers also show a series of species with their molecular weight corresponding to polymers possessing one unit of the allyl group and a terminal OH group. For homomacromers, their mol wts correspond to [allyl alcohol+-(monomer)$_m$] in structure (V); for macromer copolymers, their mol wts correspond to

[allyl alcohol+(monomer)$_{m'}$+(monomer)$_{m''}$].

In the following examples 16–19 a PECH homomacromer (VIII) wherein M is a repeating unit of ECH, is made in a manner analogous to that described hereinbefore with the following allylically unsaturated alcohols, 2-methyl-2-propene-1-ol (2MP); undecenyl alcohol (UA); cinnamyl alcohol (CA); and, allyl phenol (AP), respectively, which provide the head group for each homomacromer. The polymerization conditions are set forth in Table V hereinbelow. The targeted Mn is calculated on the basis of 90% total solids.

TABLE V

| Unsatd. alcohol | Ex. 9 2MP | Ex. 10 UA | Ex. 11 CA | Ex. 12 AP |
|---|---|---|---|---|
| wt., g | 10.71 | 22.1 | 18.2 | 6.2 |
| moles | 0.15 | 0.13 | 0.14 | 0.05 |
| ECH, wt., g | 89.3 | 78. | 81.7 | 27.9 |
| moles | 0.97 | 0.84 | 0.88 | 0.3 |
| TEOP, g | 0.075 | 0.125 | 0.075 | 0.026 |
| wt. % | 0.07 | 0.12 | 0.08 | 0.08 |
| Targeted Mn | 606 | 694 | 663 | 664 |
| Rxn temp. °C., | 32 | 35 | 35 | 33 |
| Time of rxn, hr | 7 | 7 | 8 | 6 |
| Total solids, % | 93 | 93 | 87 | 67 |

The resulting homomacromer from each of the 4 runs set forth as Exs. 11–14 in Table V hereinabove was analyzed. The results are set forth in Table VI hereinbelow. All the foregoing homomacromers are relatively low viscosity liquids. The Brookfield visc @25° C. of some of the homomacromers is stated.

TABLE VI

| Unsatd. alcohol | Ex. 9 2MP | Ex. 10 UA | Ex. 11 CA | Ex. 12 AP |
|---|---|---|---|---|
| Mn | | | | |
| from GPC | 790 | 903 | 806 | 529 |
| from OH No. | 671 | 834 | 559 | 528 |
| from I$_2$ No. | 730 | — | 937 | 416 |
| Mw/Mn | 1.4 | 1.3 | 1.5 | 7.5 |
| Brookfield visc. | 1000 | 500 | 1140 | — |
| $T_g$, by DSC, °C. | −58. | −71. | −57. | −50. |
| OH No. | 84 | 67 | 100 | 106 |
| Iodine No. | 35 | — | 27 | 61 |

FT infrared spectra and proton nmr spectra of PECH homomacromers in Exs 11–14 show characteristic absorption and chemical shifts corresponding to the allylic unsaturated group of the starting alcohol. FD mass spectra of these macromers also show a series species with their mol wts corresponding to [alcohol+-(ECH)$_{m'}$] as shown in structure (V).

It is to be noted that only primary and secondary alcohols provide the desired macromers, and tertiary alcohols do not. For example, when 2-methyl-3-butene-2-ol is used under polymerization conditions analogous to those used hereinabove, no allylic unsaturation is detected in the polymer obtained.

EXAMPLE 13

PECH homomacromer (VIII) as a dispersant in the precipitation polymerization of acrylic acid in benzene To a 2 liter jacketed glass reactor equipped with a reflux condenser and a stirrer, are charged 230 g of acrylic acid, 25.5 g of (VIII) prepared as in Ex. 2 hereinabove, 1.73 g of allyl pentaerythritol as a cross-linking agent, and 1245 g of benzene as solvent. The reactor is gradually heated from room temperature while agitating and bubbling nitrogen through the reaction mass. 0.28 g of lauroyl peroxide are added to serve as the free radical initiator when the reaction mass reached 70° C., and the reactor was allowed to reach 80° C. After 4.5 hr the reactor was commenced and it was cooled to room temperature.

The foregoing reaction was repeated under identical conditions except that no homomacromer was added.

The Brookfield viscosity of the reaction mass at 25° C., without the macromer, was 400 cps; for the reaction mass in which the macromer was added, the viscosity was 150 cps.

The reaction mass was dried at 100° C. under 26" vacuum for 16 hr with a rotary evaporator. A total of 209 g of fine powder polymer was obtained. 50 g of the powder was washed with benzene three times. Analysis shows the powder has a 2.2 wt % Cl content corresponding to incorporation of 6.4 wt % of the homomacromer.

The incorporation of a small amount of macromer does not vitiate the effectiveness of the polymer as a thickener in aqueous solutions. Only 1% by wt of the polymer in water produces a Brookfield viscosity @25° C. of 128,000 cps and a pH of 7.6. The polymer produced without the macromer, used at the same 1% by wt, has a viscosity of 129,000 and a pH of 7.5. It is evident that there is no loss in effectiveness of the polymer, but there is a highly desirable improvement in the polymerization conducted as described.

EXAMPLE 14

Preparation of a graft copolymer of ethyl acrylate and homomacromer of PECH (VIII)

In a manner analogous to that described for Example 20 hereinabove, to a 1 liter jacketed glass reactor are charged 50 g of ethyl acrylate, 20 g of macromer of PECH from Example 2, and 500 g of benzene. The copolymerization is initiated by adding 0.06 g of lauroyl peroxide and maintained at 60° C. for 5 hr. The yield of copolymer is 60 g. The copolymer is blended homogeneously with PVC serving as an impact modifier to improve the impact strength of unmodified PVC.

Having thus provided a general discussion and numerous specific illustrations of the best mode of my invention it is to be understood that no undue restrictions are to be imposed by reason thereof, except as provided by the following claims.

I claim:

1. A process for the manufacture of a water-insoluble comb-shaped copolymer of an olefinically unsaturated monomer $M_o$ with a macromer of poly(haloalkylene oxide) having an allylic group at one end and a hydroxyl group at the other, comprising, polymerizing said macromer having a structure selected from $$R—(M)_m—OH \qquad (V)$$

and $$R—(M')_{m'}—b—(M'')_{m''}—OH \qquad (VI)$$

with said monomer $M_o$ in the presence of an effective amount of a polymerization catalyst selected from the group consisting of a free radical initiator for free-radical polymerization, and, a coordination catalyst for metathesis polymerization, to yield a comb-shaped copolymer with a carbon backbone and pendant chains having a polyether structure of macromer, said copolymer being represented by the structures $$\begin{array}{c}[R'—]_{n'}—[M'_o]_{n''} \text{ and,} \\ | \\ (M)_m—OH\end{array} \qquad (VIIa)$$

$$\begin{array}{c}[R'—]_{n'}—[M'_o]_{n''} \\ | \\ (M')_{m'}\text{-b-}(M'')_{m''}—OH\end{array} \qquad (VIIb)$$

wherein,

R represents the residue of a monoolefinically unsaturated primary or secondary alcohol represented by a structure selected from the group consisting of (i)

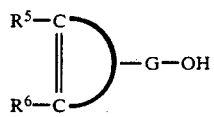

wherein G is a spacer selected from the group consisting of branched or linear alkylene, aralkylene, haloalkylene, haloaralkylene, oxyalkylene, and aryloxyalkylene, each having from 1 to about 20 carbon atoms ($C_1$–$C_{20}$); and, (ii)

wherein, the cyclic structure represents a single or fused ring structure having from 5 to 10 carbon atoms;

G is defined as above or a bond; and, $R^5$, $R^6$ and $R^7$ are independently selected from the group consisting of hydrogen, $C_1$–$C_{20}$ alkyl (having from 1 to about 20 carbon atoms) and haloalkyl, and, $C_6$–$C_{20}$ aryl and aralkyl;

$M'_o$ represents the repeating unit derived from said olefinically unsaturated monomer $M_o$, R' represents the residue of R after polymerization, M, M' and M'' represent the residues of one or more cyclic ethers which are ring-opened, at least one of which is a haloalkylene oxide having the structure $$R^1—CH\underset{R^3}{\overset{O}{\diagup\diagdown}}C—R^2 \qquad (I)$$

wherein at least one of $R^1$, $R^2$ and $R^3$ is hydrogen, at least one is haloalkyl, and the remaining substituent is selected from the group consisting of hydrogen, $C_1$–$C_{20}$ aryl, alkoxyaryl, alaryl, and aralkyl;

m represents an integer in the range from 2 to 500;

m' and m'' are integers, each in the range from 1 to about 300, such that m'+m''=m;

$M_o$ represents an olefinically unsaturated monomer selected from the group consisting of
(a) a $C_2$–$C_{12}$ vinyl monomer,
(b) a $C_8$–$C_{16}$ styryl monomer,
(c) a $C_3$–$C_8$ unsaturated carboxylic acid or its ester,
(d) a $C_4$–$C_8$ diene monomer,
(e) a $C_3$–$C_{10}$ allylically unsaturated carboxylic monomer; and,
(f) a $C_5$–$C_{14}$ cycloalkene; wherein n' represents an integer in the range from 1 to about $10^4$; and, n'' represents an integer in the range from 1 to about $10^5$.

2. The process of claim 1 wherein said vinyl monomer (a) is selected from the group consisting of vinyl chloride, vinyl acetate, acrylonitrile, vinyl benzoic acid, vinyl naphthoic acid, ethylene, propylene, 4-vinylpyridine, and vinylpyrrolidone;

said styryl monomer (b) is selected from styrene, vinyl toluene, chlorostyrene and alpha-methylstyrene;

said unsaturated carboxylic acid or carboxylic acid ester (c) is selected from the group consisting of acrylic acid, methacrylic acid, acrylic and methacrylic amide, butyl acrylate and methacrylate, ethyl acrylate and methacrylate, and, 2-ethylhexyl acrylate and methacrylate;

said diene monomer (d) is selected from the group consisting of butadiene, and isoprene;

said allylically unsaturated monomer (e) is selected from the group consisting of allyl alcohol, diallyl maleate and diallyl phthalate; and, said cycloalkene (f) is selected from the group consisting of cyclopentene, cycloheptene, norbornenes, dicyclopentadiene, norbornene, 1,5-cyclooctadiene, and norbonadiene.

3. The process of claim 1 wherein said macromer is selected from the group consisting of a homomacromer of said haloalkylene oxide (I); a macromer of said haloalkylene oxide (I) with another such haloalkylene oxide;

a macromer polyether copolymer of said haloalkylene oxide with a $C_2$–$C_{20}$ alkylene oxide or $C_4$–$C_{20}$ alkoxyalkylene oxide;

a macromer copolyether copolymer of said haloalkylene oxide with tetrahydrofuran;

a macromer polyether copolymer of said haloalkylene oxide with oxepane; and, a macromer block copolyether in which at least one block is derived from said haloalkylene oxide (I).

4. The process of claim 3 wherein said free radical initiator is present in an amount in the range from 0.001 part to about 1 part by wt per 100 parts by wt of macromer and monomers charged.

5. The process of claim 1 wherein polymerization is effected in the range from about 0° C. to about 150° C. and ambient pressure.

6. The process of claim 5 wherein said haloalkylene oxide is epichlorohydrin, and said olefinically unsaturated alcohol is allyl alcohol.

7. The process of claim 5 wherein said macromer is a macromer block copolyether having the structure $$R—(M')_{m'}—b—(M'')_{m''}—OH \qquad (VI)$$
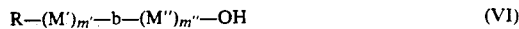

wherein M' and M'' represent two ring-opened cyclic ethers, and, m' and m'' are integers each in the range from 1 to about 300 such that m'+m''=m.

8. The process of claim 1 wherein said monoolefinically unsaturated alcohol is selected from the group consisting of (i) a monoolefinically unsaturated acyclic "allylic" alcohol having the structure (III) selected from the group consisting of (a) a relatively short chain alcohol having from 3 to about 6 carbon atoms, (b) a relatively long chain alcohol having from 7 to about 20 carbon atoms, and, (c) an arylalcohol selected from one in which the OH group is on the sidechain, and one in which the OH group is a phenolic group;

(ii) allylic cyclic alcohols having the structure (IV) wherein the olefinic doublebond is in a single or fused ring structure having from 5 to 10 carbon atoms; and, (iii) monoadducts of a single cyclic ether with the foregoing "allylic" alcohols.

9. The process of claim 8 wherein said relatively short chain alcohol is selected from the group consisting of 2-methyl-2-propen-1-ol, 2-buten-1-ol, 1-buten-3-ol, 3-buten-1-ol, 4-penten-1-ol, 2-penten-1-ol, 3-penten-2-ol, 4-penten-2-ol, 2-methyl-1-buten-3-ol, 2-methyl-1-buten-4-ol, 3-methyl-2-buten-1-ol, 2-ethyl-1-propen-3-ol, 2-ethyl-1-penten-3-ol, 5-hexen-1-ol, 4-hexen-1-ol, 5-hexen-1-ol, 2-methyl-1-penten-3-ol, 2-methyl-4-penten-3-ol, 4-methyl-3-penten-1-ol; said relatively long chain alcohol is selected from the group consisting of 9-decen-1-ol, 10-undecen-1-ol, citronellol, and oleyl alcohol; said arylalcohol is selected from the group consisting of cinnamyl alcohol, and 2-allyl phenol; said allylic cyclic alcohol is selected from the group consisting of penten-1-ol, 2-cyclohexen-1-ol, 3-cyclohexen-1-methanol, 6,6-dimethyl bicyclo[3.3.1]hept-2-ene-2-ethane[(1S)-(−)-Nopol], 5-norbornene-2-methanol, and bicyclo(2.2.2)oct-5-ene-2-methanol; said monoadduct is selected from the group consisting of 2-hydroxyethyl allyl ether, 2-hydroxy-1-methylethyl allyl ether, 2-hydroxy-2-methylethyl allyl ether, 4-hydroxybutyl allyl ether, diethylene glycol monoallyl ether, 2-hydroxy-2-chloromethyl ethyl allyl ether.

10. A water-insoluble comb-shaped copolymer of an olefinically unsaturated monomer $M_o$ with a macromer of poly(haloalkylene oxide) having an allylic group near one end and an end-capping group at the other, formed by polymerizing said macromer having a structure selected from $$R—(M)_m—Z \qquad (V)$$

and $$R—(M')_{m'}—b—(M'')_{m''}—Z \qquad (VI)$$

with said monomer $M_o$ in the presence of an effective amount of a polymerization catalyst selected from the group consisting of a free radical initiator for free-radical polymerization, and, a coordination catalyst for metathesis polymerization, to yield a comb-shaped copolymer with a carbon backbone and pendant chains having a polyether structure of macromer, said copolymer being represented by the structures $$[R'—]_{n'}—[M'_o]_{n''} \atop | \atop (M)_m—Z \qquad (VIIa)$$

and, $$[R'—]_{n'}—[M'_o]_{n''} \atop | \atop (M')_{m'}-b-(M'')_{m''}—Z \qquad (VIIb)$$

wherein,

Z is an end-capping group selected from the group consisting of —$R^5$, —$CR^5$, —$NHCR_5$, —$SIR^5_3$, —$CH_2CH_2CN$, —$SO_3Na$, —$SO_3K$, and, —$SO_3NH_4$ R represents the residue of a monoolefinically unsaturated primary or secondary alcohol represented by a structure selected from the group consisting of (i)

$$\begin{array}{c} R^5 \\ \phantom{R^5}\diagdown \\ \phantom{RRR}C{=}C{-}G{-}OH \\ \phantom{R^5}\diagup | \\ R^6 \phantom{=} R^7 \end{array} \qquad (III)$$

wherein G is a spacer selected from the group consisting of branched or linear alkylene, aralkylene, haloalkylene, haloaralkylene, oxyalkylene, and aryloxyalkylene, each having from 1 to about 20 carbon atoms ($C_1$–$C_{20}$); and, (ii)

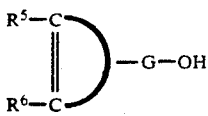 (IV)

wherein,
the cyclic structure represents a single or fused ring structure having from 5 to 10 carbon atoms;
G is defined as above or a bond; and,
$R^5$, $R^6$ and $R^7$ are independently selected from the group consisting of hydrogen, $C_1$-$C_{20}$ alkyl (having from 1 to about 20 carbon atoms) and haloalkyl, and, $C_6$-$C_{20}$ aryl and aralkyl;
$M'_o$ represents the repeating unit derived from said olefinically unsaturated monomer $M_o$,
R' represents the residue of R after polymerization,
M, M' and M" represent the residues of one or more cyclic ethers which are ring-opened, at least one of which is a haloalkylene oxide having the structure

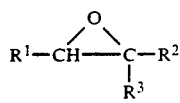 (I)

wherein
at least one of $R^1$, $R^2$ and $R^3$ is hydrogen, at least one is haloalkyl, and the remaining substituent is selected from the group consisting of hydrogen, $C_1$-$C_{20}$ aryl, alkoxyaryl, alaryl, and aralkyl;
m represents an integer in the range from 2 to 500;
m' and m" are integers, each in the range from 1 to about 300, such that $m'+m''=m$;
$M_o$ represents an olefinically unsaturated monomer selected from the group consisting of
(a) a $C_2$-$C_{12}$ vinyl monomer,
(b) a $C_8$-$C_{16}$ styryl monomer,
(c) a $C_3$-$C_8$ unsaturated carboxylic acid or its ester,
(d) a $C_4$-$C_8$ diene monomer,
(e) a $C_3$-$C_{10}$ allylically unsaturated carboxylic monomer; and,
(f) a $C_5$-$C_{14}$ cycloalkene; wherein n' represents an integer in the range from 1 to about $10^4$; and,
n" represents an integer in the range from 1 to about $10^5$.

11. The copolymer of claim 10 wherein said macromer is selected from the group consisting of
a homomacromer of said haloalkylene oxide (I); a macromer of said haloalkylene oxide with another such haloalkylene oxide;
a macromer copolyether copolymer of said haloalkylene oxide with a $C_2$-$C_{20}$ alkylene oxide or $C_4$-$C_{20}$ alkoxyalkylene oxide;
a macromer copolyether copolymer of said haloalkylene oxide with tetrahydrofuran;
a macromer copolyether copolymer of said haloalkylene oxide with oxepane; and,
a macromer block copolyether in which at least one block is derived from said haloalkylene oxide.

12. The copolymer of claim 11 wherein said macromer is a macromer block copolyether having the structure $$R-(M')_{m'}-b-(M'')_{m''}-Z \quad (VI)$$

wherein M' and M" represent two ring-opened cyclic ethers, and, m' and m" are integers each in the range from 1 to about 300 such that $m'+m''=m$.

13. The copolymer of claim 11 wherein said haloalkylene oxide is epichlorohydrin.

14. The copolymer of claim 10 wherein said monoolefinically unsaturated alcohol is selected from the group consisting of
(i) a monoolefinically unsaturated acyclic "allylic" alcohol having the structure (III) selected from the group consisting of
 (a) a relatively short chain alcohol having from 3 to about 6 carbon atoms selected from allyl alcohol, 2-methyl-2-propene-1-ol, 2-buten-1-ol, 1-buten-3-ol (1-methallyl alcohol), 3-buten-1-ol, 4-penten-1-ol, 2-pentene-1-ol, 3-penten-2-ol, 4-penten-2-ol, 2-methyl-1-buten-3-ol, 2-methyl-1-buten-4-ol, 3-methyl-2-buten-1-ol, 2-ethyl-1-propen-3-ol, 2-ethyl-1-penten-3-ol, 5-hexen-1-ol, 4-hexen-1-ol, 5-hexene-1-ol, 2-methyl-1-penten-3-ol, 2-methyl-4-penten-3-ol, and 4-methyl-3-penten-1-ol;
 (b) a relatively long chain alcohol having from 7 to about 20 carbon atoms selected from 9-decen-1-ol, 10-undecen-1-ol, citronellol and oleyl alcohol; and,
 (c) arylalcohols in which the OH group is on the sidechain, and those in which the OH group is a phenolic OH group;
(ii) allylic cyclic alcohols having the structure (IV) wherein the olefinic bond is in a single or fused ring structure having from 5 to 10 carbon atoms, selected from penten-1-ol, 2-cyclohexen-1-ol, 3-cyclohexen-1-methanol, 6,6-dimethyl bicyclo[3.3.1]hept-2-ene-2-ethanel[(1S)-(—)-Nopol], 5-norbornene-2-methanol, and bicyclo(2.2.2)oct-5-ene-2-methanol; and,
(iii) monoadducts of a single cyclic ether with the foregoing "allylic" alcohols, which is a monoadduct with an alcohol selected from the group consisting of 2-hydroxyethyl allyl ether, 2-hydroxy-1-methylethyl allyl ether, 2-hydroxy-2-methylethyl allyl ether, 4-hydroxybutyl allyl ether, diethylene glycol monoallyl ether, 2-hydroxy-2-chloromethyl ethyl allyl ether.

15. The copolymer of claim 10 wherein said monoolefinically unsaturated alcohol is selected from the group consisting of
(i) a monoolefinically unsaturated acyclic "allylic" alcohol having the structure (III) selected from the group consisting of
 (a) a relatively short chain alcohol having from 3 to about 6 carbon atoms,
 (b) a relatively long chain alcohol having from 7 to about 20 carbon atoms, and,
 (c) an arylalcohol selected from one in which the OH group is on the sidechain, and one in which the OH group is a phenolic group;
(ii) allylic cyclic alcohols having the structure (IV) wherein the olefinic doublebond is in a single or fused ring structure having from 5 to 10 carbon atoms; and,
(iii) monoadducts of a single cyclic ether with the foregoing "allylic" alcohols.

16. The copolymer of claim 15 wherein said relatively short chain alcohol is selected from the group consisting of 2-methyl-2-propen-1-ol, 2-buten-1-ol, 1- buten-3-ol, 3-buten-1-ol, 4-penten-1-ol, 2-penten-1-ol, 3-penten-2-ol, 4-penten-2-ol, 2-methyl-1-buten-3-ol, 2-methyl-1-buten-4-ol, 3-methyl-2-buten-1-ol, 2-ethyl-1-propen-3-ol, 2-ethyl-1-penten-3-ol, 5-hexen-1-ol, 4-hexen-1-ol, 5-hexen-1-ol, 2-methyl-1-penten-3-ol 2-methyl-4-penten-3-ol, 4-methyl-3-penten-1-ol; said relatively long chain alcohol is selected from the group consisting of 9-decen-1-ol, 10-undecen-1-ol, citronellol, and oleyl alcohol; said arylalcohol is selected from the group consisting of cinnamyl alcohol, and 2-allyl phenol; said allylic cyclic alcohol is selected from the group consisting of penten-1-ol, 2-cyclohexen-1-ol, 3-cyclohexen-1-methanol, 6,6-dimethyl bicyclo[3.3.1]hept-2-ene-2-ethane[(1S)-(−)-Nopol], 5-norbornene-2-methanol, and bicyclo(2.2.2)oct-5-ene-2-methanol; said monoadduct is selected from the group consisting of 2-hydroxyethyl allyl ether, 2-hydroxy-1-methylethyl allyl ether, 2-hydroxy-2-methylethyl allyl ether, 4-hydroxybutyl allyl ether, diethylene glycol monoallyl ether, 2-hydroxy-2-chloromethyl ethyl allyl ether.

* * * * *